(12) United States Patent
Phillips et al.

(10) Patent No.: US 10,521,943 B1
(45) Date of Patent: Dec. 31, 2019

(54) LOT PLANNING

(71) Applicant: Zillow, Inc., Seattle, WA (US)

(72) Inventors: Richard Phillips, Oakland, CA (US); Alexandria Phillips, Oakland, CA (US)

(73) Assignee: Zillow, Inc., Seattle, WA (US)

(*) Notice: Subject to any disclaimer, the term of this patent is extended or adjusted under 35 U.S.C. 154(b) by 0 days.

(21) Appl. No.: 15/788,488

(22) Filed: Oct. 19, 2017

Related U.S. Application Data

(60) Provisional application No. 62/411,071, filed on Oct. 21, 2016.

(51) Int. Cl.
| | | |
|---|---|---|
| *G06T 11/60* | (2006.01) | |
| *G06K 9/46* | (2006.01) | |
| *G06K 9/00* | (2006.01) | |
| *G06K 9/62* | (2006.01) | |
| G06F 3/0484 | (2013.01) | |
| G06T 3/40 | (2006.01) | |
| G06T 3/20 | (2006.01) | |
| G06T 3/60 | (2006.01) | |

(52) U.S. Cl.
CPC .......... *G06T 11/60* (2013.01); *G06K 9/00476* (2013.01); *G06K 9/46* (2013.01); *G06K 9/6201* (2013.01); *G06F 3/04842* (2013.01); *G06T 3/20* (2013.01); *G06T 3/40* (2013.01); *G06T 3/60* (2013.01)

(58) Field of Classification Search
CPC ... G06T 11/60; G06T 3/20; G06T 3/40; G06T 3/60; G06T 2207/30204; G06K 9/00476; G06K 9/46; G06K 9/6201; G06K 9/4604; G06K 9/3258; G06K 9/6232; G06Q 30/0205; H04L 51/20; G06F 3/04842; G06F 16/29; G06F 16/583; G06F 17/5081; G06F 19/00; G06F 2217/02; G06F 2217/06; G06F 2217/12; G06F 3/04817; G06F 15/16; G08G 1/0969; G08G 1/096883; G08G 1/13; G08G 1/0116
See application file for complete search history.

(56) References Cited

U.S. PATENT DOCUMENTS

| | | | |
|---|---|---|---|
| 2003/0052896 A1* | 3/2003 | Higgins | ................... G06T 17/05 345/619 |
| 2005/0114107 A1* | 5/2005 | Putnam | ................... G06T 17/05 703/6 |
| 2017/0039765 A1* | 2/2017 | Zhou | ..................... G06T 19/006 |
| 2017/0084037 A1* | 3/2017 | Barajas Hernandez | ..................... G06K 9/4671 |

OTHER PUBLICATIONS

U.S. Appl. No. 15/949,792, of Phillips, R., filed Apr. 10, 2018.

* cited by examiner

*Primary Examiner* — Xilin Guo
(74) *Attorney, Agent, or Firm* — Perkins Coie LLP

(57) ABSTRACT

A facility for computing a combined view that superimposes a graphic image representing lots onto a reference map is described. The facility identifies a set of distinguishing features in the graphic image and a set of distinguishing features in the reference map. These sets are used to compute a set of common distinguishing features using various techniques, such a cross-referencing. The facility then computes a combined view of the graphic image of lots and the reference map using the set of common distinguishing features. The facility further determines geographic coordinates of location markers on the graphic image scaled to the reference map.

18 Claims, 13 Drawing Sheets

| | 905a | 905b | 905c | 905d | 905e | 905f | 905g | 905h |
|---|---|---|---|---|---|---|---|---|
| 905 | Lot # | Lot Name | Parcel Number | Status | Lot Size | Latitude | Longitude | Actions |
| | 01 | 450 | 6 | Sold | 5.845 | 40.308347 | -76.809518 | 935a 935b |
| | 01 | 450 | 6 | Sold | 5.845 | 40.308347 | -76.809518 | |
| | 01 | 450 | 6 | Sold | 5.845 | 40.308347 | -76.809518 | |
| | 01 | 450 | 6 | Sold | 5.845 | 40.308347 | -76.809518 | |

940

Lot Number*

Lot Name*

Parcel Number

Address 1*

Address 2

Status*

Lot Size (in sq. ft.)

Lot Premium

Marketing Headline

Description

MLS ID

Eligible Plans

Latitude*

Longitude*

Save & Continue  940a
Cancel  940b

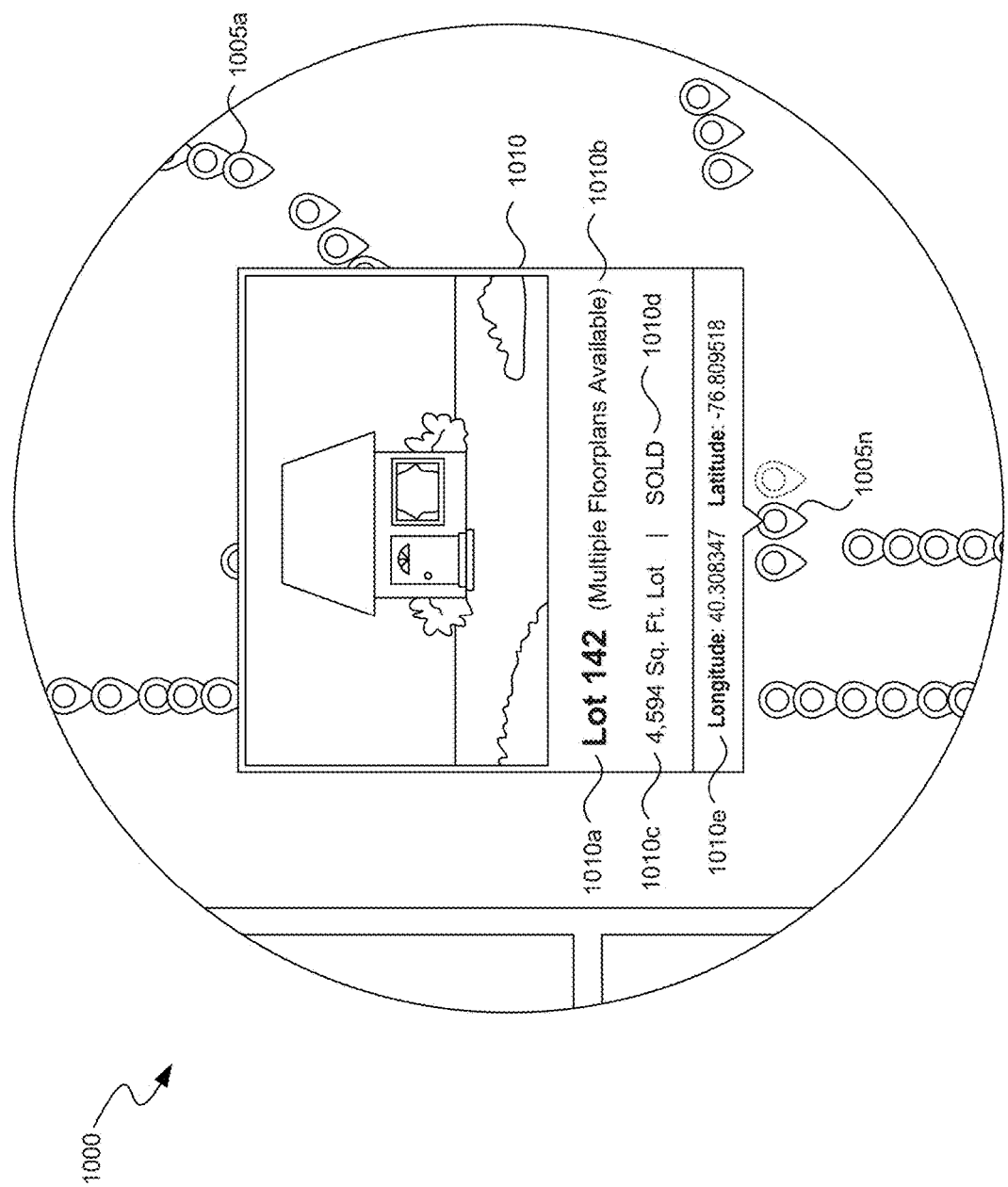

LOT PLANNING

CROSS-REFERENCE TO RELATED APPLICATION(S)

This application claims the benefit of U.S. Provisional Patent Application No. 62/411,071, filed on Oct. 21, 2016, and entitled "METHOD, SYSTEM AND APPARATUS FOR LOT PLANNING," which is incorporated herein by reference in its entirety.

BACKGROUND

Builders often purchase large parcels of land and divide it into lots to create a community.

BRIEF DESCRIPTION OF THE DRAWINGS

FIG. 9 illustrates an example of a user interface for adding and editing lot information that is associated with lots.

FIG. 10B illustrates an example of viewing a project associated with a community having lot information associated with one or more location markers on a view.

DETAILED DESCRIPTION

Figure 1:
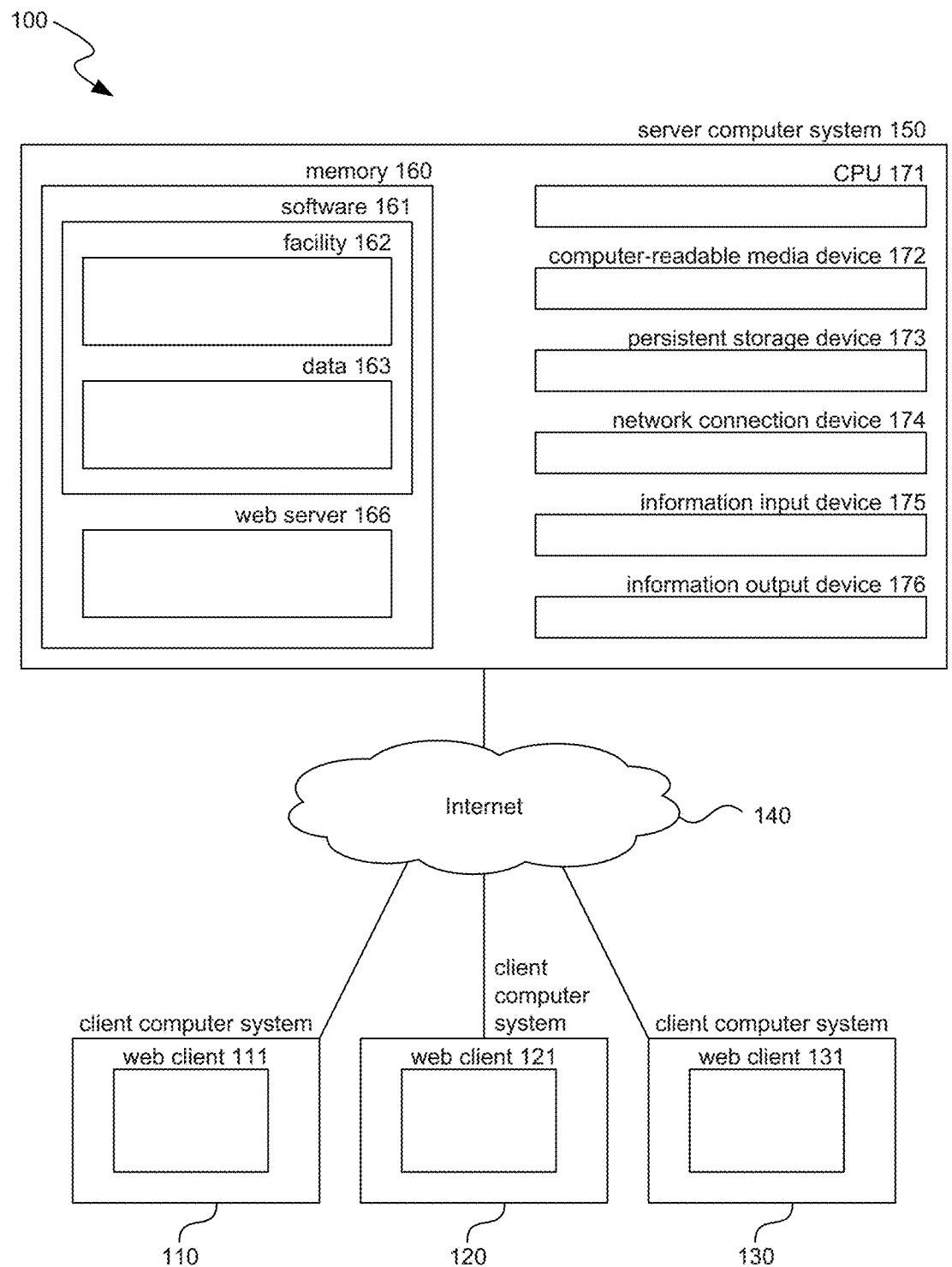
FIG. 1 is a high-level block diagram showing a typical environment in which a software, hardware, and/or firmware facility implementing the functionality described herein operates in some embodiments.

Builders generally spend significant amounts of time and money on planning studies to design and develop lot plans/maps for a community. A typical lot plan marks the boundaries of each lot in the community, as well as other notable locations, such as, community center(s), play area(s), recreation area(s), trails (e.g., walking trails, biking trails, etc.), etc. However, the lots (and other notable locations) on a lot plan often have no geographical location identifiers and therefore builders face difficulties exporting accurate geographical location identifier to mapping and property inventorying. Builders also face difficulties visualizing how a lot plan/map will be actually deployed in a parcel of land because the lot plan/map lacks geographical location identifiers. For example, while a builder might know the dimensions and location of each lot on a lot plan/map, the builder will be unable to determine the actual geographic location of each lot (e.g., the street name, street address, latitude/longitude coordinates, etc. associated with lot) on an actual parcel of land. This leads to difficulties in requesting and/or receiving government/building approvals/permits, as well as identifying placement of utility lines (e.g., electricity, telecommunications, sewer, etc.) in a community. Even if a builder were to superimpose a lot plan/map on a reference map of a geographic parcel of land, it is difficult to accurately identify the coordinates the each lot because the lot plan/map and the reference map may be of different sizes and/or orientations. Moreover, builders do not have the ability to create a combined view that illustrates not only the lot plan/map and the reference map, but also illustrates attributes of each lot (e.g., lot identifier, lot name, lot size, address, lot premium, marketing headline, etc.). As a result, dozens of expensive, well-produced lot plans/maps sit folded up in the back of the planning studies, on a shelf.

In view of the shortcomings of conventional approaches to lot planning for communities, the inventors have recognized that a new approach to lot planning that was more universally accurate, less expensive, and more convenient would have significant utility.

A software, hardware, and/or firmware facility ("the facility") for constructing a combined view for lot planning is described. In some embodiments, the facility receives graphic image(s) representing lot maps/plans and reference map(s) associated with geographic areas (e.g., parcels of land). The facility then analyzes both the graphic image(s) and the reference map(s) to identify distinguishing features in each received image/map. For example, the facility identifies features such as landmarks, street names, street intersections, rivers, lakes, bodies of water, man-made features, natural features, coordinates. The facility then identifies a set of common features that appear in both the graphic image(s) and reference map(s). For example, the facility identifies common street name and street intersections among the graphic image(s) and reference map(s). Based on the identified common features, the facility constructs a combined view that depicts an overlap between the graphic image(s) and reference map(s). In doing so, the facility scales, rotates, or otherwise modifies either the graphic image(s) and/or the reference map(s). The constructed combined view is an accurate representation of the lot map's placement on a parcel of land. For example, the facility accurately identifies the geographic coordinates of each lot in the lot plan.

In some embodiments, the facility associates each lot with unique features, such as lot identifier, lot name, parcel number, address, MLS identifier, and coordinates (e.g., latitude and longitude). The facility associates other features with each lot, such as lot premium, marketing headline, description, and eligible plans (e.g., home plans, floor plans, elevation plans, etc.). The facility displays the constructed combined view at a user interface, where a user can select one or more lots (e.g., by clicking on a lot in the combined view) to view/edit/export associated lot features.

FIG. 1 is a high-level block diagram showing a typical environment in which the facility operates in some embodiments. The environment 100 includes a server computer system 150. The server computer system 150 includes a memory 160. The memory 160 includes software 161 incorporating both the facility 162 and data 163 typically used by facility. The memory further includes a web server computer program 166 for providing web pages and/or other information, such as information produced by the facility, to other computers. While items 162 and 163 are stored in memory while being used, those skilled in the art will appreciate that these items, or portions of them, maybe be transferred between memory and a persistent storage device 173 for purposes of memory management, data integrity, and/or other purposes. The server computer system 150 further includes one or more central processing units (CPU) 171 for executing programs, such as programs 161, 162, and 166, and a computer-readable medium drive 172 for reading information or installing programs such as the facility from tangible computer-readable storage media, such as a floppy disk, a CD-ROM, a DVD, a USB flash drive, and/or other tangible computer-readable storage media. The computer system 150 also includes one or more of the following: a network connection device 174 for connecting to a network (for example, the Internet 140) to exchange programs and/or data via its networking hardware, such as switches, routers, repeaters, electrical cables and optical fibers, light emitters and receivers, radio transmitters and receivers, and the like; an information input device 175; and an information output device 176.

The block diagram also illustrates several client computer systems, such as client computer systems 110, 120, and 130. Each of the client computer systems includes a web client computer program, such as web clients 111, 121 and 131, for receiving web pages and/or other information in response to requests to web server computer programs, such as web server computer program 166. The client computer systems are connected via the Internet 140 or a data transmission network of another type to the server computer system 150. Those skilled in the art will recognize that the client computer systems could be connected to the server computer system 150 by networks other than the Internet, however. In some embodiments, some or all of the client computer systems are used to capture input to the facility and display output from the facility. In some embodiments, these client computer systems can include other server computer systems, desktop computer systems, laptop computer systems, mobile phones, personal digital assistants, tablet computers, televisions, cameras, automobile computers, electronic media players, etc. In various embodiments, these client computer systems include various combinations of the components shown in server computer system 150.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
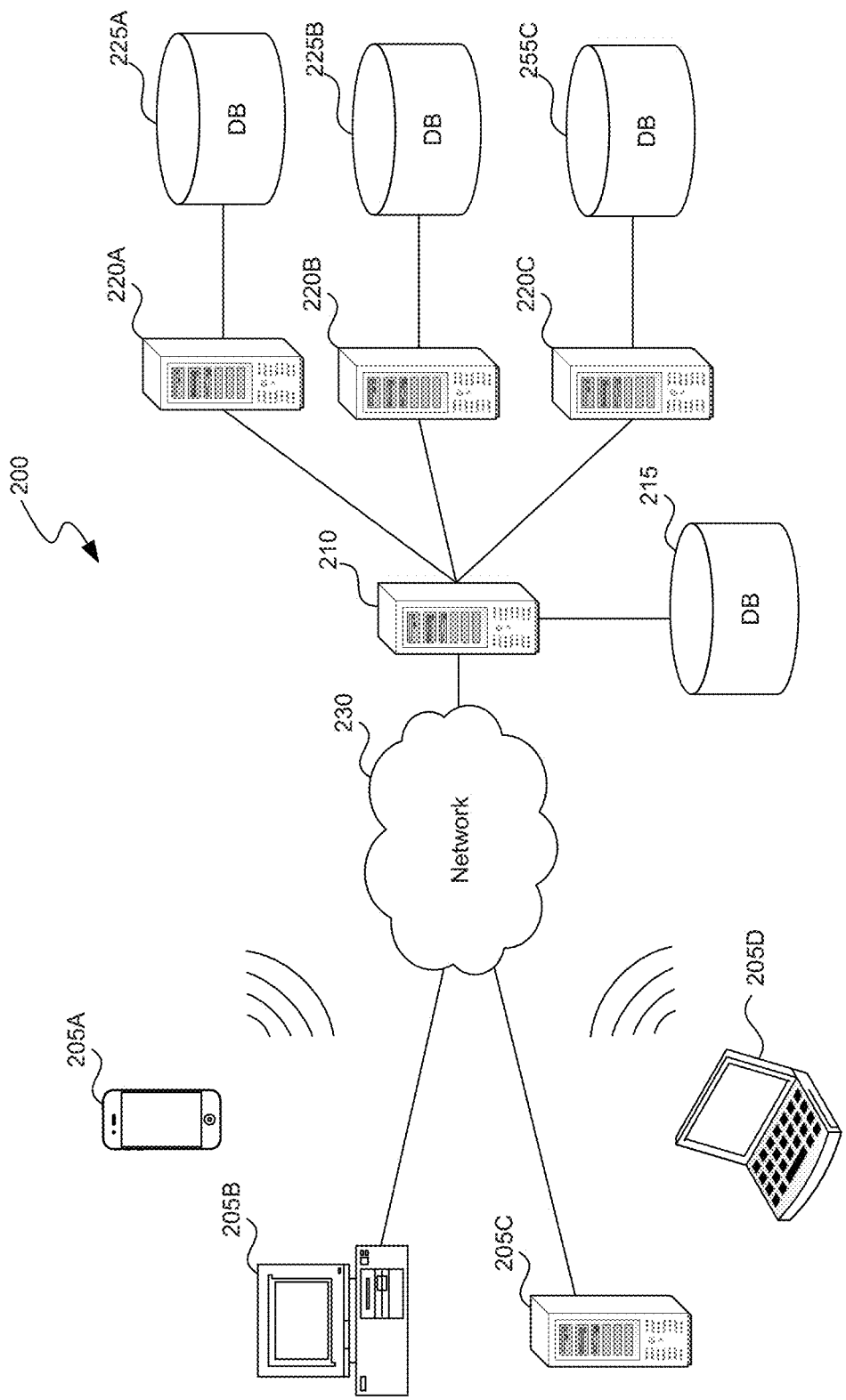
FIG. 2 is a block diagram illustrating an overview of an environment in which some embodiments can operate.

FIG. 2 is a block diagram illustrating an overview of an environment 200 in which some embodiments of the facility can operate. Environment 200 can include one or more client computing devices 205A-D, examples of which can include, but are not limited to, personal computers, server computers, handheld or laptop devices, cellular telephones, wearable electronics, tablet devices, mobile devices, multiprocessor systems, microprocessor-based systems, set-top boxes, programmable consumer electronics, network PCs, minicomputers, mainframe computers, and distributed computing environments that include any of the above systems or devices, or the like. Reference map information and/or graphic image comprising lot information can be uploaded using one or more client computing devices 205A-D and transmitted, through network 230, to one or more computers, such as a server computing device 210.

Figure 3:
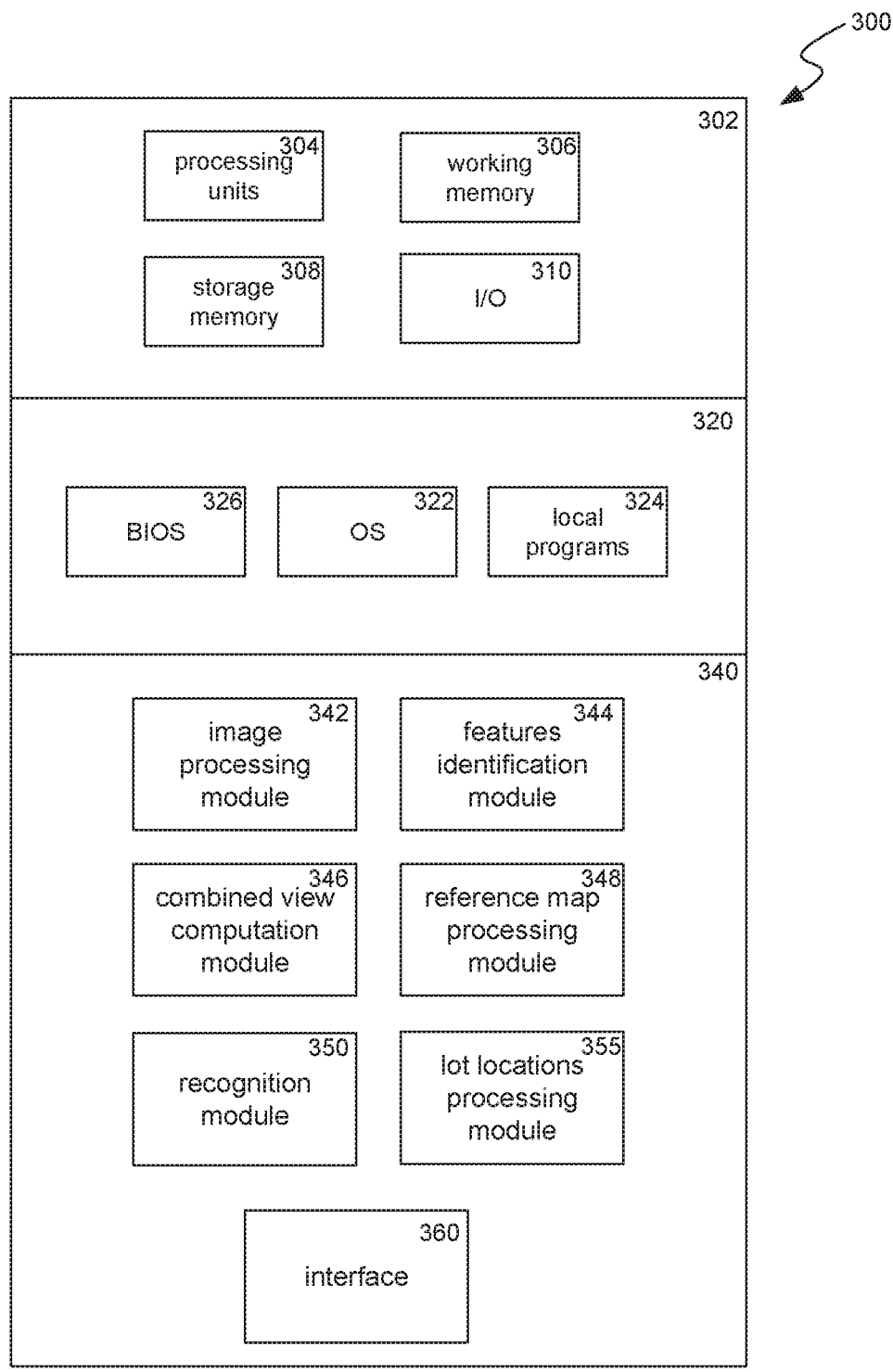
FIG. 3 is a block diagram illustrating components of a system employing some embodiments of the facility.

A server computing device 210 can comprise computing systems, such as device 300 (FIG. 3). Though the server computing device 210 is displayed logically as a single server, server computing devices can each be a distributed computing environment encompassing multiple computing devices located at the same or at geographically disparate physical locations. In some embodiments, each server computing device 210 corresponds to a group of servers. In some embodiments, a server computing device 210 can be a web server or an application server. The server computing device 210 can connect to a database 215. As discussed above, each server computing device 210 can correspond to a group of servers, and each of these servers can share a database or can have their own database. Database 215 can warehouse (e.g. store) information such as reference maps, graphic images, metadata, combined views, location markers, identifying features, profiles (user profile, project profile, client profile, community profile, etc.), lot information, permissions, security, settings, other supporting information, etc. Though database 215 is displayed logically as a single unit, it can be a distributed computing environment encompassing multiple computing devices, can be located within its corresponding server, or can be located at the same or at geographically disparate physical locations.

Server computing device 210 can be connected to one or more devices 220A-C. Examples of devices 220A-C include, but are not limited to, smartphones, tablets, laptops, personal computers, etc. The server computing devices 220A-C can connect to database 225A-C, respectively. Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. Although the connections between server 210 and devices 220 are shown as separate connections, these connections can be any kind of local, wide area, wired, or wireless network, including network 230 or a separate public or private network.

FIG. 3 is a block diagram illustrating components 300 which, in some embodiments, can be used in a system employing the facility. The components 300 include hardware 302, general software components 320, and specialized components 340. As discussed above, a system implementing the facility can use various hardware including central processing units 304, working memory 306, storage memory 308, and input and output devices 310. Components 300 can be implemented in a server computing device, such as server computing devices 210 and/or 220A-C.

General software 320 can include various applications including an operating system 322, local programs 324, and a basic input output system (BIOS) 326. Specialized components 340 can be subcomponents of a general software application 320, such as local programs 324. Specialized components 340 can include image processing engine 342, features identification engine 344, combined view computation engine 346, reference map engine 348, features recognition tool 350, lot locations processing engine 355, and components which can be used for transferring data and controlling the specialized components, such as interface 360. In some embodiments, components 300 can be in a computing system that is distributed across multiple computing devices or can be an interface to a server-based application executing one or more of specialized components 340.

Image processing engine 342 manages and maintains graphic images of lot maps. Lot maps represent maps of home lots and/or plats/parcels of lands. Graphic images of lot maps may be received via a user upload, created by a user or a system, or may be automatically selected from a storage location. Graphic images of lot maps may be associated with identifying information (e.g., image identifier, image name, user name, profile name, community name, city name, etc.) and stored in a database. Image processing engine 342 may manage associations between graphic images and profiles (e.g., general profile, administrative profile, user profile, community profile, company profile, etc.). Reference map engine 348 manages and maintains reference maps of one or more locations (e.g., a subdivision, neighborhood, county, city, town, state, etc.). Reference maps may be associated with metadata and/or identifying information (e.g., map identifier, map name, user name, profile name, community name, city name, etc.) and stored in a database. Reference map engine 348 may manage associations between reference maps and profiles (e.g., general profile, administrative profile, user profile, community profile, company profile, etc.). Reference map(s) may include a digital third party map, a map API, a digital map created by a user, a digital map created by user's company, a digital map created by user's client, a digital map from a city clerk's office, a digital map from a state office, a digital map from The United States Geological Survey, a digital map from a land survey, a digital map from a foreign country, a digital map of a planet, a digital map of a moon, multiple digital maps grouped together.

Features identification engine 344 identifies, manages, and maintains information about distinguishing features in graphic images of lot maps and/or reference maps. For example, in some embodiments, features identification engine 344 may manually or automatically search a graphic image to identify a set of graphic image distinguishing features such as landmarks, street names, street intersections, rivers, lakes, bodies of water, man-made features, natural features, coordinates, and/or addresses matching landmarks, street names, street intersections, rivers, lakes, bodies of water, man-made features, natural features, coordinates, and/or addresses on the reference map. In some embodiments, features identification engine 344 may manually or automatically search a reference map to identify a set of reference map distinguishing features such as landmarks, street names, street intersections, rivers, lakes, bodies of water, man-made features, natural features, coordinates, and/or addresses matching landmarks, street names, street intersections, rivers, lakes, bodies of water, man-made features, natural features, coordinates, one or more parcels of land having no buildings, and/or addresses on the graphic image. Graphic image distinguishing features and reference map distinguishing features may be stored in one or more of databases, tables, arrays, linked lists, trees, queues, stacks, graphs, heaps and/or other data structures. In this manner, found features in the graphic image may be matched to searchable features in the reference map.

Combined view computation engine 346 computes, manages, and maintains information about combined views that represent, for example, overlap between one or more graphic images and one or more reference maps. For example, combined view computation engine 346 may cross-reference one or more graphic image distinguishing features and/or reference map distinguishing features to compute a combined view that represents an overlap view between the graphic image(s) and reference map(s). The combined view computation engine 346 may compute a combined view by positioning the graphic image(s) over the reference map(s), matching one or more respective distinguishing features overlaid on top of one another. The combined view computation engine 346 may store information associated with graphic image(s) and/or reference map(s) allowing for viewing a combined view that represents an overlap of the graphic image and reference map.

The combined view computation engine 346 computes a combined view by extending either graphic image(s), reference map(s), or both to partially cover or extending over, and/or superimposing, for example, graphic image(s) over reference map(s). In some embodiments, the combined view computation engine 346 may perform one or more modification actions on graphic images and/or reference maps. Examples of modification actions include, but are not limited to, scaling, dragging, positioning, resizing, rotating, and/or moving. In some embodiments, the combined view computation engine 346 may automatically perform one or more of the modification actions on the graphic image by identifying one or more distinguishing features on the reference map. In some embodiments, the combined view computation engine 346 may automatically perform one or more of the modification actions on a reference map by identifying one or more distinguishing features on the graphic image. In some embodiments, the combined view computation engine 346 may perform one or more modification actions based on user input, via, for example, a graphical user interface. For example, the combined view computation engine 346 may scale a graphic image upon receiving a user input to scale the graphic image (e.g., by using an image scaling tool at a graphical user interface).

A features recognition tool 350 analyzes one or more distinguishing features identified by, for example, the features identification engine 344 on the graphic image(s) and/or reference map(s) to determine one or more sets of distinguishing features information (e.g., type of distinguishing feature (e.g., coordinates, landmarks, streets, rivers, lakes, etc.), unique identifier, name, etc.). Information such as metadata, search results and/or features recognition tool results may be used by the combined view computation engine 346 to compute a combined view that represents an overlap between graphic image(s) and reference map(s).

A lot locations processing engine 355 maintains and manages information about one or more lot locations on a combined view. For example, one or more location markers may be used to mark a lot location. Location markers may be represented as a pin. In some embodiments, location markers may visually convey information about the lot location. For example, a color scheme may be used to convey information about available lots (e.g., green pins), sold lots (e.g., red pins), and lots under contract (e.g., blue pins). In some embodiments, a user may drag and drop location markers on a reference map, a graphic image, and/or the combined view, via, for example, a graphical user interface. Each lot may be assigned a lot number. In some embodiments, location information expressed as latitude, longitude and/or elevation coordinates may be determined for one or more location markers. Location information may be expressed as a set of numbers, letters or symbols which indicate a location is determined for one or more markers. Tools for determining the location of one or more markers may include a geographic coordinate system, Universal Transverse Mercator System (UTM) system, postal system (e.g., UPS), stereographic coordinate system, Cartesian system, North East Down (NED) system, etc.

In some embodiments, location information of location markers may be stored in a data structure associated with a combined view, a graphic image and/or a reference map. Location information of each location marker may be stored in association with a community, a project, a developer, a company, one or more individuals and/or one or more users. Location information of each location marker may be stored in one or more of databases, tables, arrays, linked lists, trees, queues, stacks, graphs, heaps and/or other data structures.

Figure 4:
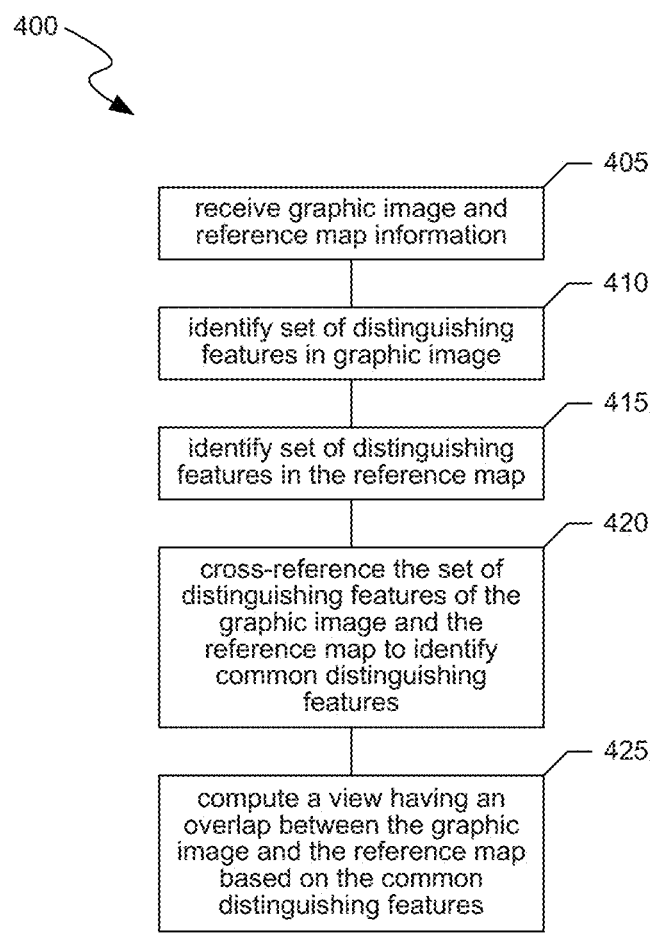
FIG. 4 is a flow diagram illustrating a process used in some embodiments for computing a combined view by overlapping a graphic image with a reference map.

FIG. 4 is a flow diagram illustrating a process 400 performed by the facility in some embodiments for computing a combined view by overlapping a graphic image with a reference map. Process 400 begins at block 405, where the facility receives information related to one or more graphic images and/or reference maps. Lot maps represent maps of home lots and/or plats/parcels of land. In various embodiments, the facility receives graphic images of lot maps via a user upload, created by a user or a system, or may be automatically selected from a storage location. A reference map may include a digital third party map, a map API, a digital map created by a user, a digital map created by user's company, a digital map created by user's client, a digital map from a city clerk's office, a digital map from a state office, a digital map from The United States Geological Survey, a digital map from a land survey, a digital map from a foreign country, a digital map of a planet, a digital map of a moon, multiple digital maps grouped together.

Figure 5:
FIG. 5 illustrates an embodiment that includes a feature of a user uploading or selecting a graphic image of a lot map from a user interface.

FIG. 5 is a display diagram showing a user interface presented by the facility in some embodiments to enable a user to upload or select a graphic image of a lot map from a graphical user interface 500 (e.g., via a website, a mobile application, etc.). For example, a user can browse and choose a file containing a graphic image using a browse button 510. In some embodiments, a user can enter a URL that identifies a graphic image using control 520. In some embodiments, the user interface includes a tool that allows a user to create a graphic image, select/upload a graphic image from a third party, select/upload a graphic image associated with the user profile, select/upload a graphic image associated with a company profile, select/upload a graphic image associated with a community profile, and/or select/upload a graphic image created by another user. The uploaded/selected/created graphic image may be saved using a save button 530. If a user decides to cancel the upload, the user can select a cancel button 540. Additional features not shown in the figure include the option to save the uploaded/selected graphic image to a profile, user profile, a company profile and/or community profile. In some embodiments, the graphic image can be variable degrees of opacity. The graphic image opacity can be adjustable. The graphic image may include renderings of structures, land lot boundaries and/or metadata information.

After receiving (or retrieving) graphic image and/or reference map information, process 400 proceeds to block 410 where the facility identifies a set of graphic image distinguishing features such as landmarks, street names, street intersections, rivers, lakes, bodies of water, man-made features, natural features, coordinates, and/or addresses matching landmarks, street names, street intersections, rivers, lakes, bodies of water, man-made features, natural features, coordinates, and/or addresses on the reference map. At block 415, the facility searches the reference map(s) to identify a set of reference map distinguishing features such as landmarks, street names, street intersections, rivers, lakes, bodies of water, man-made features, natural features, coordinates, and/or addresses matching landmarks, street names, street intersections, rivers, lakes, bodies of water, man-made features, natural features, coordinates, one or more parcels of land having no buildings, and/or addresses on the graphic image. At block 420, the facility identifies common distinguishing features among the set of graphic image distinguishing features and the set of reference map distinguishing features. The facility may utilize information about the distinguishing features (e.g., unique feature identifier, type, name, location (e.g., latitude/longitude/elevation coordinates, etc.) in each set to identify the set of common distinguishing features. For example, the facility may cross-reference information about one or more graphic image distinguishing features and/or reference map distinguishing features to identify a set of common distinguishing features that are common among the respective sets. At block 425, the facility computes a combined view that represents an overlap view between the graphic image(s) and reference map(s). The combined view may be computed by (logically or physically) positioning the graphic image(s) over the reference map(s), using, for example, features in the set of common distinguishing features.

Figure 6:
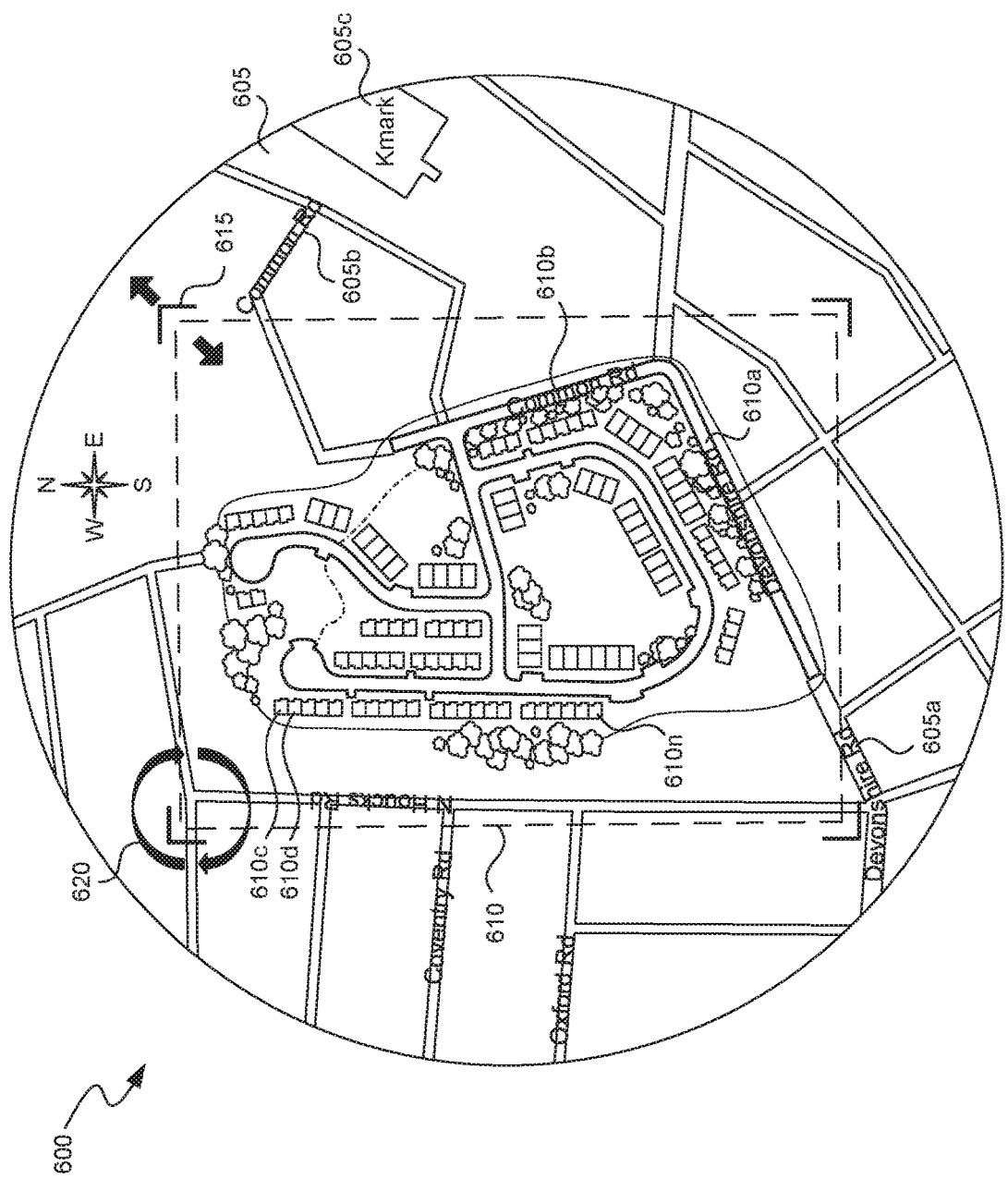
FIG. 6 illustrates an embodiment that includes overlapping a graphic image with a reference map to create a combined view.

FIG. 6 is a display diagram showing a user interface presented by the facility in some embodiments to create a combined view 600 by overlapping a graphic image 610 with a reference map 605. The facility may create a combined view 600 by storing information associated with a graphic image 610 and/or a reference map 605, which allows for viewing an overlap of the graphic image and reference map. A set of graphic image distinguishing features may comprise Devonshire Road 610a, Common Road 610b, lot 610c, lot 610d, . . . , lot 610n). Similarly, a set of reference map distinguishing features may comprise Devonshire Road 605a, Common Road 605b, grocery store 605c, etc. The facility may cross-reference information about one or more graphic image distinguishing features (set comprising features 610a, 610b, . . . , 610n) and/or reference map distinguishing features (set comprising features 605a, 605b, and 605c) to identify a set of common distinguishing features that are common among the respective sets (e.g., set comprising features 605a-610a and 605b-610b).

An overlap of the graphic image and reference map may include extending over as to partially cover placing or extending over, and/or superimposing. In some embodiments, the facility provides controls to perform modification actions, such as a scaling control 615 and/or a rotation control 620, that allows a graphic image and/or a reference map to be modified. Examples of modification action include, but are not limited to, scaling, dragging, positioning, resizing, rotating, and/or moving. In some embodiments, the facility may automatically perform one or more of the modification actions on the graphic image by identifying one or more distinguishing features on the reference map. In some embodiments, the facility may automatically perform one or more of the modification actions on a reference map by identifying one or more distinguishing features on the graphic image.

Figure 7:
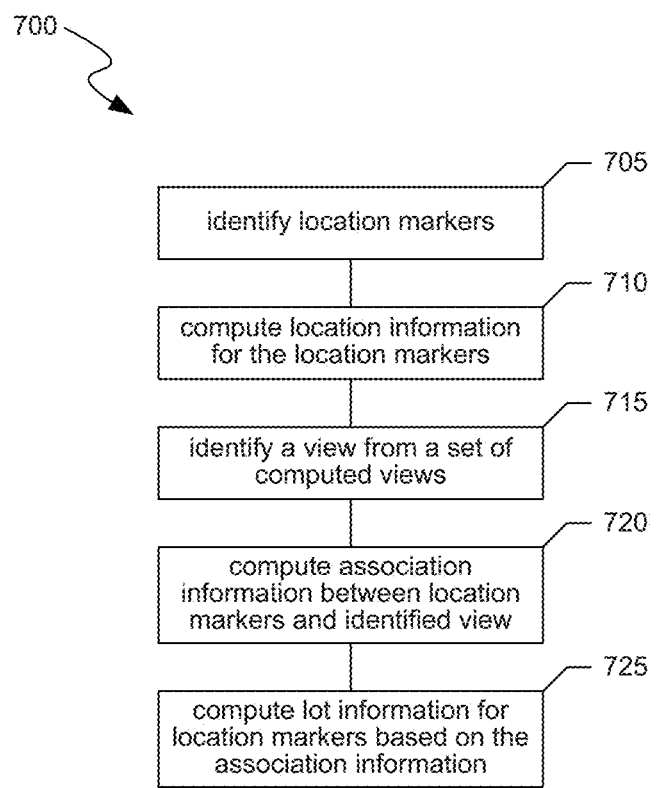
FIG. 7 is a flow diagram illustrating a process used in some embodiments for computing lot information using location markers.
Figure 8:
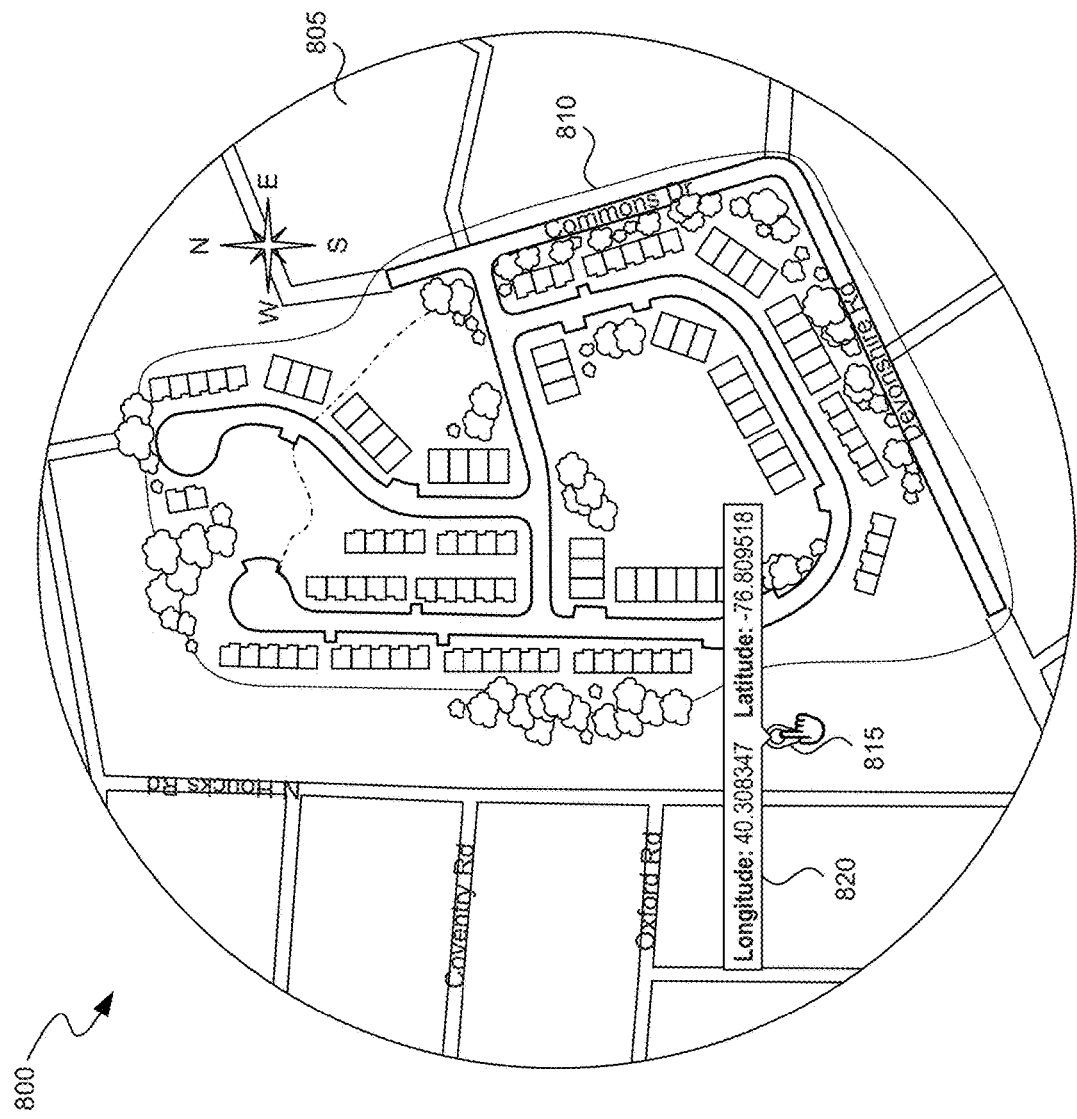
FIG. 8 illustrates an embodiment that includes the teaching of lot markers on a combined view.

FIG. 7 is a flow diagram illustrating a process 700 performed by the facility in some embodiments for computing lot information using location markers. Process 700 begins at block 705 where one or more location markers are identified. Location markers may be identified manually by a user (e.g., by dragging and dropping onto a selected combined view via a graphical user interface) or automatically by, for example, the facility. Location markers may be represented as pins or some other visual mark. A location marker may represent a lot. Each lot can be assigned a lot number. For example, FIG. 8 is a display diagram showing a user interface presented by the facility in some embodiments to enable identification of a location marker 815, with coordinates displayed in control 820, on a combined view 800 (of a reference map 805 and a graphic image of a lot map 810).

Process 700 then proceeds to block 710 where the facility computes associated location information for the identified location markers and the selected combined view. Location information can be expressed in latitude, longitude, and/or elevation coordinates (e.g. control 820 in FIG. 8). Location information can be expressed as a set of numbers, letters or symbols which indicate a location is determined for one or more markers. In some embodiments, one or more of the following location determination tools may be used to determine the location information of one or more markers: geographic coordinate system, UTM system, UPS system, stereographic coordinate system, Cartesian system, and/or NED system. Location information of each location marker can be stored in one or more of databases, tables, arrays, linked lists, trees, queues, stacks, graphs, heaps and/or other data structures. Location information can include one or more of a community, lot number, lot name, parcel number, address fields, status, lot size, lot premium, marking headline, description, MLS ID, eligible plans, latitude, longitude, realtor information, photographs, graphic images, and/or additional information. In some embodiments, location information of each location marker can be stored in a data structure associated with the view, graphic image and/or reference map. Location information of each location marker may be stored in association with a community, a project, a developer, a company, one or more individuals and/or one or more users. Process 700 then proceeds to block 715 where the facility identifies a combined view onto which location markers are to be added. A combined view may be identified manually by a user (e.g., by selecting a combined view stored in a database, uploading a combined view, etc.). At block 720, process 700 computes association information between the identified location markets (at block 705) and the identified combined view (at block 715). Process 700 then proceeds to block 725 where it computes lot information for location markers based on the computed association information.

FIG. 9 is a display diagram showing a user interface 900 presented by the facility in some embodiments to enable viewing, adding, and editing lot information that is associated with lots. The information associated with lots may be obtained automatically by the facility. The user interface 900 may display lot information 905 of one or more lots. The lots may be associated with a profile, user profile, a company profile and/or a community profile. Lot information 905 may comprise of the following information elements: lot number 905a, lot name 905b, parcel number 905c, status 905d (e.g., sold, available, under contract, etc.), lot size 905e, latitude coordinates 905f, and longitude coordinates 905g. Other examples of lot information include, but are not limited to, community information (e.g., community identifier, community name, builder, etc.), address, lot premium, marking headline, description, MLS ID, eligible plans, realtor information, photographs, graphic images, and/or additional information. A user may be able to take one or more actions, using control 905h, for a lot. For example, a user may edit lot information (using control 935a) or delete a lot (using control 935b). A user may add a new lot using control 940. After adding details about one or more information elements for a lot, the user may save and continue (using control 940a) or cancel the addition of the new lot information (using control 940b). In some embodiments, lot information may be exported to a file. The lot information may be automatically transmitted to a local or remote location.

Figure 10A:
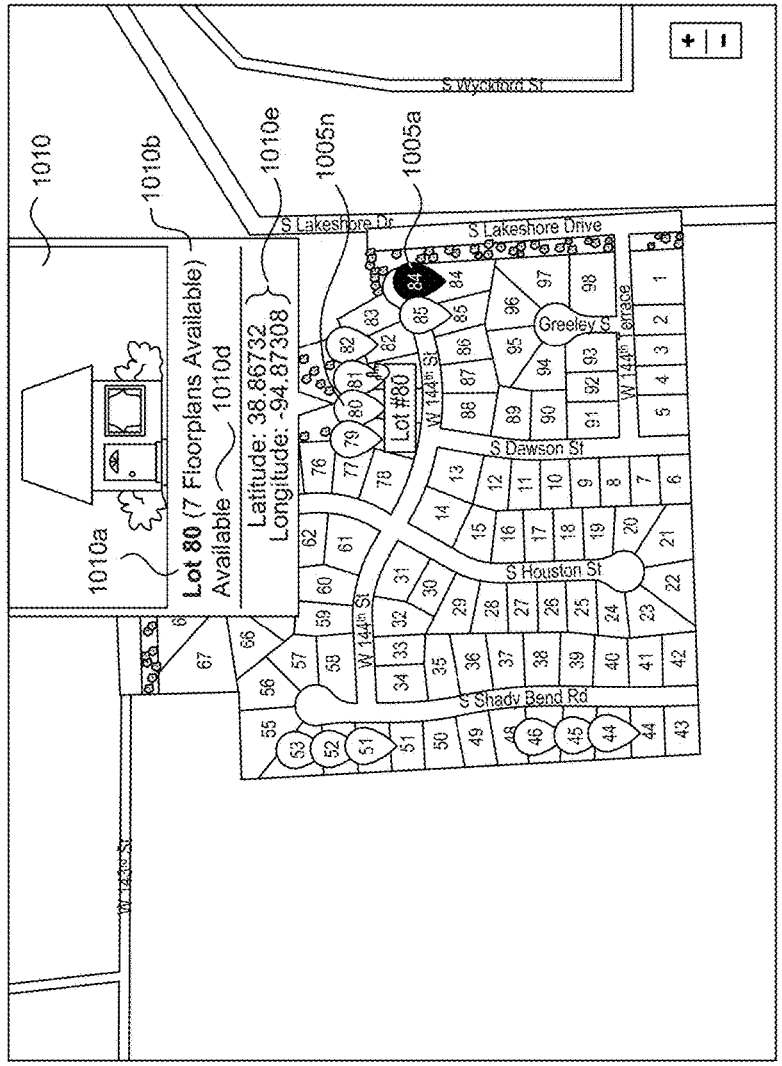
FIG. 10A illustrates an example of viewing a project associated with a community having lot information associated with one or more location markers on a view.

FIGS. 10A and 10B are display diagrams showing a user interface presented by the facility in some embodiments to enable viewing a project associated with a community having lot information associated with one or more location markers on a combined view 1000. The combined view 1000 may comprise of one or more location markers 1005a, . . . , 1005n. A user may select a location marker (e.g., 1005n) located on the combined view 1000 to view a control that displays lot information 1010. Lot information control may display one or more information elements such as lot number 1010a, available plans 1010b, lot size 1010c, status 1010d, and coordinates (longitude and latitude) 1010e. One or more location markers can be selected and multiple sets of lot information can be viewed either singularly or in aggregate (e.g., in control 1020). For example, a user may be able to view the following information elements for one or more location markers: lot number 1020a, lot name 1020b, parcel number 1020c, status 1020d, lot size 1020, latitude 1020f, and longitude 1020g. In some embodiments only a subset of the information elements may be displayed when a particular location marker is selected. For example, when control 1020 displays several information elements, control 1010 displays only a subset of information elements for a selected location marker 1050n. A user may be able to take one or more actions (e.g., edit, delete, etc.) on a lot, using, for example, control 1020h. A user may be able to add a lot to a view using an Add New Lot control 1015.

Figure 11:
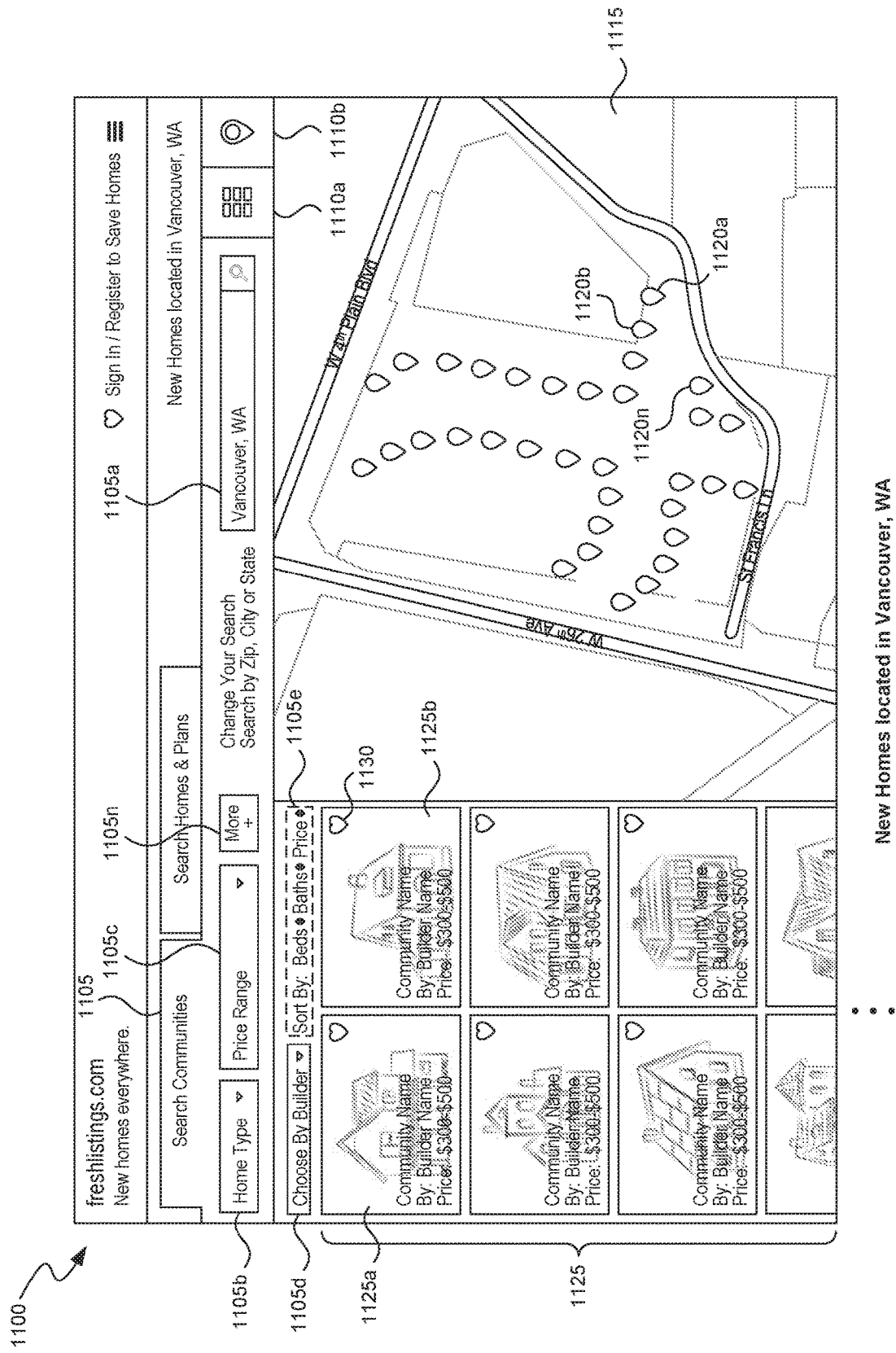
FIG. 11 illustrates an example of searching for and viewing communities (and associated projects) and/or location markers.

FIG. 11 is a display diagram showing a user interface 1100 presented by the facility in some embodiments to enable searching for and viewing communities (and associated projects) and/or location markers. A search feature can allow a user to search by entering search criteria and view the matching results. A user may specify one of more search criteria 1105 to search communities and/or location markers. For example, a user may specify a lot information, location (control 1105a) such as a zip code, city, state, etc., a type of home (control 1105b), a price range (control 1105c), and/or additional information (using control 1105n) to search for matching communities. The user may further refine the search results by selecting a builder (control 1105d) and/or sort the results using control 1105e (e.g., sort by lot information, community information, etc.) Search results may be presented in a variety of styles. For example, graphical user interface 1100 may display search results in the form of a grid 1125, each element of which comprises projects matching the search criteria (e.g., 1125a, 1125b, etc.). Each grid element may display an image of the community, community name, builder name, price range, listing status, address, general information, graphic images, videos, testimonials, amenities, services, maps, utilities, and/or school information, etc. One or more plan/models may be associated with one or more of communities, users, companies, and/or lots. In some embodiments, graphical user interface 1100 may display the matching search results on a graphical map 1115 (e.g., a combined view) upon selection of control 1110b. Search results may be represented by location markers 1120a, 1120b, . . . 1120n. In some embodiments, graphical user interface 1100 may display the matching search results in a grid format upon selection of control 1110a. A user may be able to select one or more communities as favorites using, for example, control 1130.

Figure 12:
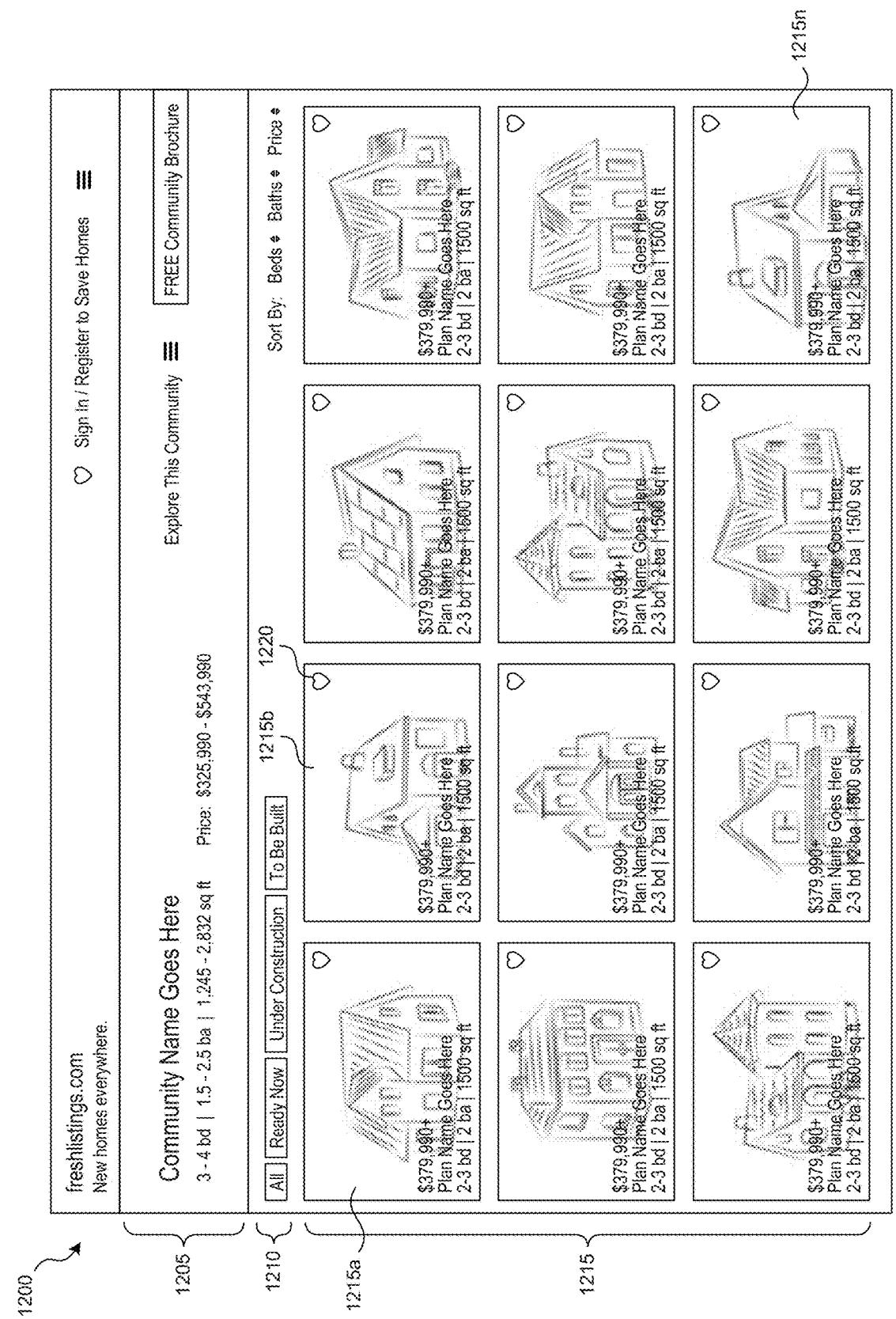
FIG. 12 illustrates an example of searching for and viewing projects associated with communities.

A user may click on one or more identified communities to view additional details. FIG. 12 is a display diagram showing a user interface 1200 presented by the facility in some embodiments to enable viewing additional details associated with a selected community. For example, general information about a community (e.g., community names, lot sizes, price range, number of bedrooms, number of bathrooms, etc.) may be displayed in control 1205. A user may filter the displayed results using filter 1210 (all homes, under construction, etc.). Graphical user interface 1200 may further display information about plans/models associated with the community in control 1215 (e.g., plan 1215*a*, 1215*b*, . . . 1215*n*). A user may be able to select one or more plans/models as favorites using, for example, control 1220.

In some embodiments, permissions, security and settings can be configured for one or more of user profile information, project, client profile information, community profile information, company information, lot information, and/or maps. The permissions, security and settings may include information users can edit, modify or add to one or more of user profile information, project, client profile information, community profile information, company information, lot information, and/or maps. Multiple projects may be stored and associated with the community. The permissions, security and settings may include information users associated with a company profile can edit, modify or add to one or more of user profile information, project, client profile information, community profile information, company information, lot information, and/or maps.

In some embodiments, a user may access the database using user device, a user device can include a personal device, a mobile device, a tablet, a personal computer, and/or device having a hardware processor. The database can be stored on a computer, a server, a mobile device, and/or a device having a hardware processor.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

Those skilled in the art will appreciate that the process shown in FIGS. 4 and 7 may be altered in a variety of ways. For example, the order of the acts may be rearranged; some acts may be performed in parallel; shown acts may be omitted, or other acts may be included; a shown acts may be divided into sub acts, or multiple shown acts may be combined into a single act, etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

The invention claimed is:

1. A non-transitory computer-readable storage medium whose contents are capable of causing a computing system to perform a method for automatically computing a combined view depicting an overlap between a graphic image and a reference map, the method comprising:
    receiving a lot map graphic image representing a map of lots in a community;
    receiving a reference map representing a geographic area;
    using computer-implemented image processing techniques to analyze the lot map graphic image by automatically searching the lot map graphic image of the map of lots in the community to identify a set of lot map graphic image distinguishing features comprising landmarks, street names, street intersections, rivers, lakes, bodies of water, man-made features, natural features, location coordinates, one or more parcels of land having no buildings, addresses, or any combination thereof;
    using computer-implemented image processing techniques to analyze the reference map by automatically searching the reference map representing the geographic area to identify a set of reference map distinguishing features comprising landmarks, street names, street intersections, rivers, lakes, bodies of water, man-made features, natural features, location coordinates, one or more parcels of land having no buildings, addresses, or any combination thereof;
    automatically evaluating the set of lot map graphic image distinguishing features and the set of reference map distinguishing features to identify a set of common distinguishing features, wherein the set of common distinguishing features comprises distinguishing features that are each present in both the set of lot map graphic image distinguishing features and the set of reference map distinguishing features; and
    constructing a combined view depicting an overlap between the graphic image and the reference map using the set of common distinguishing features.

2. The computer-readable storage medium of claim 1, wherein the graphic image is retrieved using a webpage.

3. The computer-readable storage medium of claim 1, wherein at least one of the graphic image, the reference map, or the combined view is associated with a profile, a user profile, an organization profile, a community profile, or any combination thereof.

4. The computer-readable storage medium of claim 1, wherein the reference map comprises a digital third-party map, a user-created digital map, a digital map created by a user's organization, a digital map created by a user's client, a digital map from an authorized source, a digital map from a land survey, a digital map from a foreign country, or any combination thereof.

5. The computer-readable storage medium of claim 1, wherein at least one of the graphic image, the reference map, or the combined view is associated with metadata comprising information of one or more associated properties.

6. The computer-readable storage medium of claim 1, wherein the method further comprises altering at least one of the graphic image or the reference map by performing one or more of following modification actions: scaling, dragging, positioning, resizing, rotation, and moving.

7. The computer-readable storage medium of claim 1, wherein identifying the set of common distinguishing features further comprises cross-referencing features in the set of graphic image distinguishing features with features in the set of reference map distinguishing features to identify common features.

8. The computer-readable storage medium of claim 1, wherein the method further comprises receiving a location marker, from a user, to place on the combined view to identify a location selected by the user, wherein the location marker uniquely identifies the location on the combined view.

9. The computer-readable storage medium of claim 8, wherein the location marker represents a lot in the community.

10. The computer-readable storage medium of claim 8, wherein the location marker is associated with location information comprising at least one of latitude coordinates, longitude coordinates, or elevation coordinates of the location on the combined view.

11. A method in a computing system for automatically computing a combined view depicting an overlap between a graphic image and a reference map, comprising:

receiving, at the computing system, a lot map graphic image representing a map of lots in a community;

receiving, at the computing system, a reference map representing a geographic area;

using computer-implemented image processing techniques to analyze the lot map graphic image by automatically searching the lot map graphic image of the map of lots in the community to identify a set of lot map graphic image distinguishing features comprising landmarks, street names, street intersections, rivers, lakes, bodies of water, man-made features, natural features, location coordinates, one or more parcels of land having no buildings, addresses, or any combination thereof;

using computer-implemented image processing techniques to analyze the reference map by automatically searching the reference map representing the geographic area to identify a set of reference map distinguishing features comprising landmarks, street names, street intersections, rivers, lakes, bodies of water, man-made features, natural features, location coordinates, one or more parcels of land having no buildings, addresses, or any combination thereof;

automatically evaluating the set of lot map graphic image distinguishing features and the set of reference map distinguishing features to identify, by the computing system, a set of common distinguishing features, wherein the set of common distinguishing features comprises distinguishing features that are each present in both the set of at lot map, graphic image distinguishing features and the set of reference map distinguishing features; and constructing, by the computing system, a combined view depicting an overlap between the graphic image and the reference map using the set of common distinguishing features.

12. The method of claim 11, wherein at least one of the graphic image, the reference map, or the combined view is associated with a profile, a user profile, an organization profile, a community profile, or any combination thereof.

13. The method of claim 11, wherein the reference map comprises a digital third-party map, a map API, a user-created digital map, a digital map created by a user's organization, a digital map created by a user's client, a digital map from an authorized source, a digital map from a land survey, a digital map from a foreign country, or any combination thereof.

14. The method of claim 11, wherein at least one of the graphic image, the reference map, or the combined view is associated with metadata comprising information of one or more associated properties.

15. The method of claim 11, further comprising altering at least one of the graphic image or the reference map by performing one or more of following modification actions: scaling, dragging, positioning, resizing, rotation, and moving.

16. A computer system for automatically computing a combined view depicting an overlap between a graphic image and a reference map, comprising:

at least one processor and at least one memory, cooperating to function as:

an image processing module which receives a lot map graphic image representing a map of lots in a community;

a reference map processing module which receives a reference map representing a geographic area;

a features identification module which uses computer-implemented image processing techniques to analyze the lot map graphic image of the map of lots in the community to automatically identify a set of lot map graphic image distinguishing features comprising landmarks, street names, street intersections, rivers, lakes, bodies of water, man-made features, natural features, location coordinates, one or more parcels of land having no buildings, addresses, or any combination thereof, wherein the features identification module further uses the computer-implemented image processing techniques to analyze the reference map representing the geographic area to automatically identify a set of reference map distinguishing features comprising landmarks, street names, street intersections, rivers, lakes, bodies of water, man-made features, natural features, location coordinates, one or more parcels of land having no buildings, addresses, or any combination thereof;

a recognition module which automatically evaluates the set of lot map graphic image distinguishing features and the set of reference map distinguishing features to identify a set of common distinguishing features, wherein the set of common distinguishing features comprises distinguishing features that are each present in both the set of lot map graphic image distinguishing features and the set of reference map distinguishing features; and a combined view computation module which constructs a combined view depicting an overlap between the graphic image and the reference map using the set of common distinguishing features.

17. The computer system of claim 16, wherein at least one of the graphic image, the reference map, or the combined view is associated with a profile, a user profile, an organization profile, a community profile, or any combination thereof.

18. The computer system of claim 16, wherein the reference map comprises a digital third-party map, a map API, a user-created digital map, a digital map created by a user's organization, a digital map created by a user's client, a digital map from an authorized source, a digital map from a land survey, a digital map from a foreign country, or any combination thereof.

* * * * *

UNITED STATES PATENT AND TRADEMARK OFFICE
CERTIFICATE OF CORRECTION

PATENT NO. : 10,521,943 B1
APPLICATION NO. : 15/788488
DATED : December 31, 2019
INVENTOR(S) : Phillips et al.

Page 1 of 1

It is certified that error appears in the above-identified patent and that said Letters Patent is hereby corrected as shown below:

In the Specification

In Column 10, Line 18, delete "1020," and insert -- 1020e, --, therefor.

In the Claims

In Column 13, Line 30, in Claim 11, delete "map," and insert -- map --, therefor.

Signed and Sealed this
Seventeenth Day of March, 2020

Andrei Iancu
*Director of the United States Patent and Trademark Office*